(12) United States Patent
Liu et al.

(10) Patent No.: US 9,348,159 B2
(45) Date of Patent: May 24, 2016

(54) EJECTION HEAD FOR EJECTING ALIGNMENT FILM FORMING COMPOSITION

(71) Applicant: Shenzhen China Star Optoelectronics Technology Co., Ltd., Shenzhen, Guangdong (CN)

(72) Inventors: Ming Liu, Shenzhen (CN); Tao Song, Shenzhen (CN); Tao Ma, Shenzhen (CN); Guodong Zhao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 235 days.

(21) Appl. No.: 13/979,650

(22) PCT Filed: Jun. 20, 2013

(86) PCT No.: PCT/CN2013/077542
§ 371 (c)(1),
(2) Date: Jul. 13, 2013

(87) PCT Pub. No.: WO2014/201651
PCT Pub. Date: Dec. 24, 2014

(65) Prior Publication Data
US 2015/0034735 A1 Feb. 5, 2015

(30) Foreign Application Priority Data
Jun. 17, 2013 (CN) .......................... 2013 1 0239500

(51) Int. Cl.
*G02F 1/13* (2006.01)
*B05B 15/02* (2006.01)
(Continued)

(52) U.S. Cl.
CPC ............ *G02F 1/1303* (2013.01); *B05B 1/3053* (2013.01); *B05B 15/025* (2013.01); *B05B 1/14* (2013.01); *G02F 1/1337* (2013.01)

(58) Field of Classification Search
CPC ........... G02F 1/13; G02F 1/1303; B65B 1/20; B65B 1/14; B65B 15/025; B65B 1/30; B65B 1/3053; B65B 15/02; B08B 5/02

USPC ........ 239/112, 319, 562, 102.2, 585.1, 585.4, 239/106, 368, 369, 366, 1–4; 137/216.16, 137/512.6, 518, 909; 362/96, 562, 806; 222/108, 110, 421, 422, 571, 148
See application file for complete search history.

(56) References Cited

U.S. PATENT DOCUMENTS 3,315,199 A * 4/1967 Koch ................... B23K 11/002
174/94 R
5,226,565 A * 7/1993 Hladis ............... B01F 15/00025
222/148

(Continued)

FOREIGN PATENT DOCUMENTS

CN 1991533A A 7/2007

*Primary Examiner* — Arthur O Hall
*Assistant Examiner* — Joseph A Greenlund
(74) *Attorney, Agent, or Firm* — Andrew C. Cheng

(57) ABSTRACT

An ejection head for ejecting alignment film forming composition includes multiple nozzles. Each nozzle includes a chamber, a composition source, and a control valve. A liquid transportation pipe and a pusher are disposed on the bottom and the top of the chamber, respectively. The pusher is used for pushing the alignment film forming composition out of the liquid transportation pipe. The composition source is used for transporting the alignment film forming composition to the chamber. The control valve is used for controlling switching of the liquid transportation pipe to control output of the alignment film forming composition. Owing to the control valve and the blowing device, the alignment film forming composition is prevented from condensing on the nozzle and blocking the nozzle or from forming large droplets because of accumulation. In this way, the quality of the alignment film is greatly enhanced owing to uniform spraying and regular output.

6 Claims, 2 Drawing Sheets

(51) Int. Cl.
*B05B 1/30* (2006.01)
*B05B 1/14* (2006.01)
*G02F 1/1337* (2006.01)

(56) References Cited

U.S. PATENT DOCUMENTS

| | | | | |
|---|---|---|---|---|
| 5,960,713 | A * | 10/1999 | DeMoore | B41F 23/08 101/137 |
| 7,659,963 | B2 * | 2/2010 | Kweon | B05B 15/0208 349/189 |
| 7,679,463 | B2 * | 3/2010 | Pernia | H03L 1/022 331/108 C |
| 7,954,434 | B2 * | 6/2011 | Yeo | B65G 49/061 104/281 |
| 7,958,914 | B2 * | 6/2011 | Song | B05B 17/0607 141/11 |
| 8,453,945 | B2 * | 6/2013 | Wurz | B05B 7/0458 239/106 |
| 8,490,646 | B2 * | 7/2013 | Bush | E03D 3/06 137/487.5 |
| 8,492,183 | B2 * | 7/2013 | Long | H01L 27/1292 257/E21.211 |
| 8,922,746 | B2 * | 12/2014 | Ma | G02F 1/1341 349/154 |
| 2006/0170733 | A1 * | 8/2006 | Lee | B41J 2/16579 347/54 |
| 2009/0169717 | A1 * | 7/2009 | Wen | G02F 1/1303 427/8 |
| 2011/0278323 | A1 * | 11/2011 | Pozzi | A61F 9/0008 222/108 |
| 2014/0299157 | A1 * | 10/2014 | Song | B41J 2/16532 134/18 |
| 2015/0028125 | A1 * | 1/2015 | Fukuda | B41J 2/14233 239/102.2 |
| 2015/0034735 | A1 * | 2/2015 | Liu | B05B 15/025 239/112 |

\* cited by examiner

EJECTION HEAD FOR EJECTING ALIGNMENT FILM FORMING COMPOSITION

BACKGROUND OF THE INVENTION

1. Field of the Invention

The present invention relates to a liquid crystal display technology, and more particularly, to the improvement of an ejection head for ejecting alignment film forming composition.

2. Description of the Prior Art

A liquid crystal display (LCD) includes two glass substrates and a liquid crystal layer disposed between the glass substrates. At present, the LCD mainly refers to a thin film transistor (TFT) LCD. Basically, it takes three processes to produce the TFT LCD: to form patterns on the glass substrates, to seal liquid crystal between the glass substrates to form a liquid crystal cell, and to assemble a liquid crystal module (LCM). To cost down and to make products diverse, more than one liquid crystal cell is used on the glass substrates; instead, multiple liquid crystal cells are horizontally arranged on the glass substrates. The number of the liquid crystal cells and the position of the liquid crystal cells on the glass substrates are different depending on the model and the size of an individual product. After the liquid crystal is sealed, multiple liquid crystal cells on the glass substrates are cut to form a single liquid crystal display cell.

Liquid display units are formed after liquid crystal is sealed between the two glass substrates. In the process of producing liquid display units, an alignment film is disposed on each liquid display unit zone (short for display zone; other zones except for the display zone being called non-display zones). The alignment film disposed on the display zone of the glass substrate is equipped with alignment after being rubbed or being illuminated. In this way, the alignment film can affect the liquid crystal layer; that is, the liquid crystal is uniformly arranged in a fixed direction.

The formation of the alignment film comprises steps of (1) coating: alignment film forming composition is formed on the surface of a substrate through printing; the alignment film forming composition has been diluted with a solvent; (2) drying: the solvent is evaporated at about 100 degrees, and an alignment film which is equally distributed is formed; (3) baked: the alignment film is solidified at more than 180 degrees. In the step of coating, a roller coater is usually used. A PI (polyimide film) inkjet printing is also used.

The operating status of the inkjet printing is shown in FIG. 1. The alignment film forming composition is stored on the ejection head 110 and is sprayed out via a large number of fine nozzles 120 disposed on the ejection head 110. A glass substrate 130 is disposed on the print base 140. The alignment film forming composition sprayed via the nozzles 120 will fall on the glass substrate 130 and form uniform alignment droplets after the print base 140 moves or the ejection head 110 moves automatically. The alignment droplets will condense and become an alignment film after the alignment droplets spread on their own. A plurality of ejection heads 110 are used to cover the glass substrate 130 completely. The plurality of ejection heads 110 are controlled to spray the alignment film forming composition or to not spray the alignment film forming composition to decide where to be coated on the glass substrate 130.

The structure of the conventional nozzle 120 is shown in FIG. 2. The nozzle 120 comprises a chamber 121 and a composition source 126.

A liquid transportation pipe 124 and a pusher 122 are disposed on the bottom of the chamber 121 and the top of the chamber 121, respectively. The liquid transportation pipe 124 and the pusher 122 correspond with each other. The pusher 122 is used to push the alignment film forming composition out of the liquid transportation pipe 124.

Further, an inner annular groove 123 is disposed around the liquid transportation pipe 124 in the chamber 121. The inner annular groove 123 is connected to a liquid supply pipe 125 and is used to temporarily preserve the alignment film forming composition providing by the composition source 126. A bulge 127 is disposed between the inner annular groove 123 and the liquid transportation pipe 124 and is used to restrict flow direction of the alignment film forming composition flowing from the liquid supply pipe 125.

The composition source 126 is connected to the liquid supply pipe 125 disposed on the chamber 121 and is used to transport the alignment film forming composition to the chamber 121.

The use of the inkjet printing requires cooperation of its related technology. The alignment film forming composition tends to be spread unevenly once the droplets are larger. The larger droplets may damage the glass substrate, resulting drop mura, etc., so the nozzle is required to be as small as possible. In the production process of the alignment film, the operation time of the nozzle takes less than 30 percent of the total production time. In other words, the nozzle stays in an idle state for most of time, waiting for adjustment and operation of the equipment, input and output of raw material, etc. The spraying does not take much time in reality.

Because the idle time is long and the exit of the nozzle is small, the alignment film forming composition has to stay in the nozzle for a longer time. Some problems easily occur. Take one possible problem for example. The alignment film forming composition compries high polymers which has stickiness and solid content (the solid content of the liquid crystal is about 3-8% in general). The longer the alignment film forming composition stays on the nozzle, the easier the high polymers condense because the liquid solvent volatilizes easily and form large droplets. This will affect the quality of the alignment film. If the large droplets are not sprayed out for a long time, the condensed high polymers will even block the exit of the nozzle, causing the alignment film forming composition to not flow out normally.

It is urgent to solve the problems mentioned above such as how to improve the conventional nozzle, how to control the output timing of alignment film forming composition effectively, how to prevent high polymer alignment from condensing, and even how to avoid the nozzle from being blocked off.

SUMMARY OF THE INVENTION

An object of the present invention is to provide an ejection head for ejecting alignment film forming composition. The ejection head can control flowing timing of the alignment film forming composition properly. The ejection head opens or closes the liquid transportation pipe in a timely way according to a real condition. The ejection head for ejecting alignment film forming composition comprises a plurality of nozzles disposed on a bottom of the ejection head. Each nozzle comprises: a chamber, comprising a liquid transportation pipe and a pusher disposed on a bottom and a top of the chamber, respectively, the liquid transportation pipe and the pusher corresponding with each other, and the pusher used for pushing the alignment film forming composition out of the liquid transportation pipe; a composition source connected to a liquid supply pipe disposed on the chamber, for transporting the alignment film forming composition to the chamber; and a control valve disposed on the liquid transportation pipe, for controlling switching of the liquid transportation pipe for restricting output of the alignment film forming composition.

Preferably, the control valve comprises a magnetic valve and a driver for controlling an operating status of the magnetic valve.

Preferably, the magnetic valve comprises: a magnetic armature, operatively disposed in the liquid transportation pipe, a first angle formed between the armature and a cross section of the liquid transportation pipe, so that the armature prevents the alignment film forming composition from flowing out of the liquid transportation pipe, and a second angle formed between the armature and the cross section of the liquid transportation pipe, so that the armature allows the alignment film forming composition to flow out of the liquid transportation pipe; and magnetic valve, disposed on one side of the liquid transportation pipe and corresponding to the armature, and controlled by the driver to affect magnetic forces that the magnetic valve gives the armature for controlling mutual variations between the first angle and the second angle.

Preferably, the armature forms transition fit with the liquid transportation pipe.

Preferably, the nozzle further comprises a blowing device corresponding to an exit of the liquid transportation pipe for blowing off superfluous alignment film forming composition remaining at the exit of the liquid transportation pipe.

Preferably, the blowing device comprises an air tube and a blower, the air tube is disposed on one side of the liquid transportation pipe and is connected to the liquid transportation pipe, and the blower is connected to the air tube and supplies flowing air source to the air tube.

Preferably, the pusher is a ceramic resonator.

Preferably, an inner annular groove is disposed around the liquid transportation pipe in the chamber, the inner annular groove is connected to the liquid supply pipe for temporarily preserving the alignment film forming composition providing by the composition source, a bulge is disposed between the inner annular groove and the liquid transportation pipe for restricting flow direction of the alignment film forming composition flowing from the liquid supply pipe.

Preferably, the nozzle further comprises a central controller connected to the composition source, the pusher, the driver, and the blower, respectively.

In contrast to prior art, a control valve and a blowing device are newly added in the present invention. The control valve is used to control switching of the liquid transportation pipe, which controls the output timing of the alignment film forming composition. In addition, the blowing device is used to keep airflow moving at an exit of the nozzle of the liquid transportation pipe in an idle state, which ensures that the exit of the nozzle is unblocked and that the alignment film forming composition does not aggregate or condense, which prevents the nozzle from being blocked and avoids forming large droplets. In this way, the quality of the alignment film is greatly enhanced owing to uniform spraying and regular output.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

An object of the present invention is to solve problems caused by the conventional nozzle, such as occlusion and drop condensation.

Figure 1:
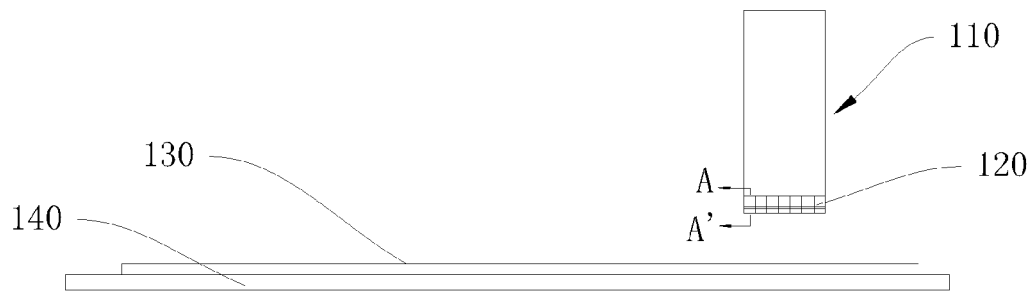
FIG. 1 shows a conventional ejection head, a glass substrate, and a print table.
Figure 2:
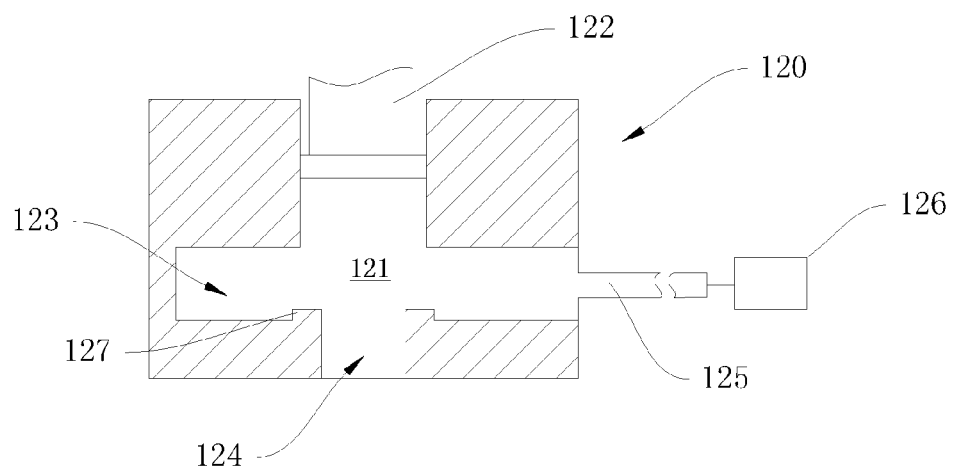
FIG. 2 shows a cross section view of the nozzle as shown in FIG. 1 along line AA'.
Figure 3:
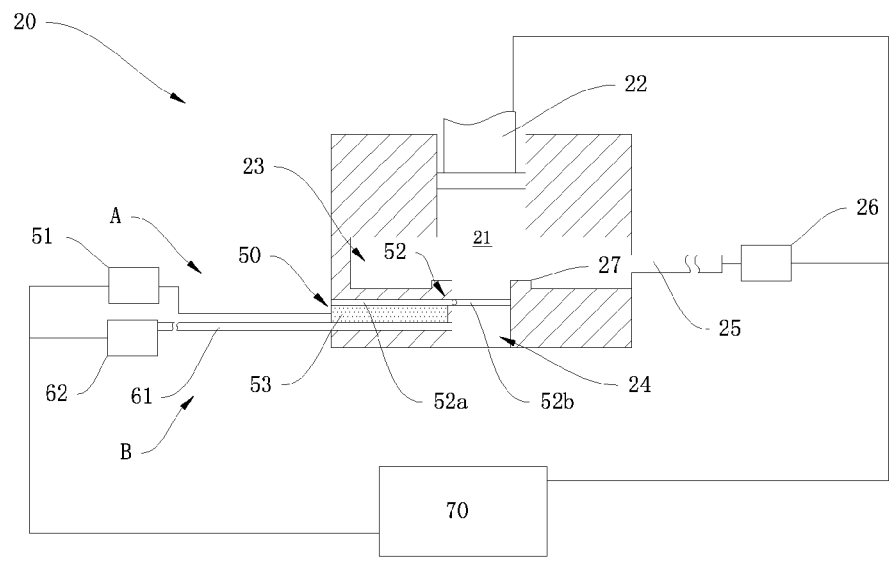
FIG. 3 shows a schematic diagram of a nozzle according to a first embodiment of the present invention.

The ejection head in the present embodiment comprises a plurality of nozzles 20. The structure of the nozzle 20 is improved. FIG. 3 shows the internal structure of the nozzle 20. Each of the plurality of nozzles 20 comprises a chamber 21 and a composition source 26.

A liquid transportation pipe 24 and a pusher 22 are disposed on the bottom of the chamber 21 and the top of the chamber 21, respectively. The liquid transportation pipe 24 and the pusher 22 correspond with each other. The pusher 22 is used to push the alignment film forming composition out of the liquid transportation pipe 24. The pusher 22 may be a ceramic resonator.

An inner annular groove 23 is disposed in the chamber 21 and surrounds the liquid transportation pipe 24. The inner annular groove 23 is connected to a liquid supply pipe 25 and is used to temporarily preserve the alignment film forming composition provided by the composition source 26. A bulge 27 is disposed between the inner annular groove 23 and the liquid transportation pipe 24 and is used to restrict flow direction of the alignment film forming composition flowing from the liquid supply pipe 25. The alignment film forming composition is temporarily preserved in the inner annular groove 23. Afterwards, the alignment film forming composition flows to the liquid transportation pipe 24.

The composition source 26 is connected to the liquid supply pipe 25 disposed on the chamber 21. The composition source 26 is used to transport the alignment film forming composition to the chamber 21 through the liquid supply pipe 25.

The nozzle 20 further comprises a control valve A disposed on the liquid transportation pipe 24. The control valve A is used to control the switching of the liquid transportation pipe 24 so that the alignment film forming composition is controlled. The control valve A is not restricted to hydraulic pressure or a pneumatic type. Also, the control valve A can be expectantly controlled according to different circuits. The accuracy and flexibility of controlling the control valve A is guaranteed. The control valve A operates with a magnetic valve 50 and a driver 51. The driver 51 controls the operating status of the magnetic valve 50. As shown in FIG. 3, the magnetic valve 50 comprises a magnetic armature 52 and a magnetic valve 53. The armature 52 is operatively disposed in the liquid transportation pipe 24. The magnetic valve 53 is disposed on one side of the liquid transportation pipe 24 (inside the chamber 21) and corresponds to the armature 52 up-down. The magnetic valve 53 can be a strip wound core solenoid, which is frequently used. The magnetic valve 53 is electrified through the driver 51. The electrified magnetic valve 53 is magnetic, and magnetism of the electrified magnetic valve 53 can be controlled by the driver 51 by means of adjusting the supply current. To ensure the stability of the magnetic valve 53, the magnetic valve 53 is not connected to the liquid transportation pipe 24.

To fix the armature 52 on the liquid transportation pipe 24 effortlessly, the armature 52 is divided into two portions: an active portion 52b and a fixing portion 52a. The active portion 52b and the fixing portion 52a are hinged with each other. The fixing portion 52a is inserted into the nozzle 20 from one side of the nozzle 20 and fixed in a side wall of the liquid transportation pipe 24 and connected to the top of the magnetic valve 53. The active portion 52b extrudes into the liquid transportation pipe 24. The shape and size of the active portion 52b is close to that of the hole of the liquid transportation pipe 24. So the active portion 52b can be attached to the liquid transportation pipe 24 and rotate with the hinged fixing portion 52a in the liquid transportation pipe 24 with magnetic forces. The driver 51 controls the magnetic valve 53 to affect the magnetic forces that the magnetic valve 53 gives the armature 52, so the active portion 52b can rotate in the liquid transportation pipe 24. In this way, the switching of the liquid transportation pipe 24 is controlled and the output timing of the alignment film forming composition is controlled. Further, to make the armature 52 better, the hinge of the active portion 52b and the fixing portion 52a can be a memorable hinge. That is, when the magnetic forces that the active portion 52b receives from the magnetic valve disappear, the active portion 52b can automatically returns to the status that the fixing portion 52a stays. Of course, the active portion 52b can rotate and return to its original position by means of operation of other loading bodies (for example, an air force generated by the blowing device B afterwards) in another embodiment. Besides, the armature 52 and the magnetic valve 53 disposed in the nozzle 20 can be taken apart and replaced easily.

A first angle and a second angle are formed between the active portion 52b of the armature 52 and a cross section of the liquid transportation pipe 24. The armature 52 prevents the alignment film forming composition from flowing out of the liquid transportation pipe 24 because of the first angle. The armature 52 allows the alignment film forming composition to flow out of the liquid transportation pipe 24 because of the second angle.

For example, a first angle (about zero degree) is defined when the active portion 52b is parallel to (or overlaps) or near parallel to the cross section of the liquid transportation pipe 24. The active portion 52b can form transition fit with the liquid transportation pipe 24. In other words, the active portion 52b blocks off the flow of the alignment film forming composition in the liquid transportation pipe 24, so the liquid transportation pipe 24 is closed.

Figure 4:
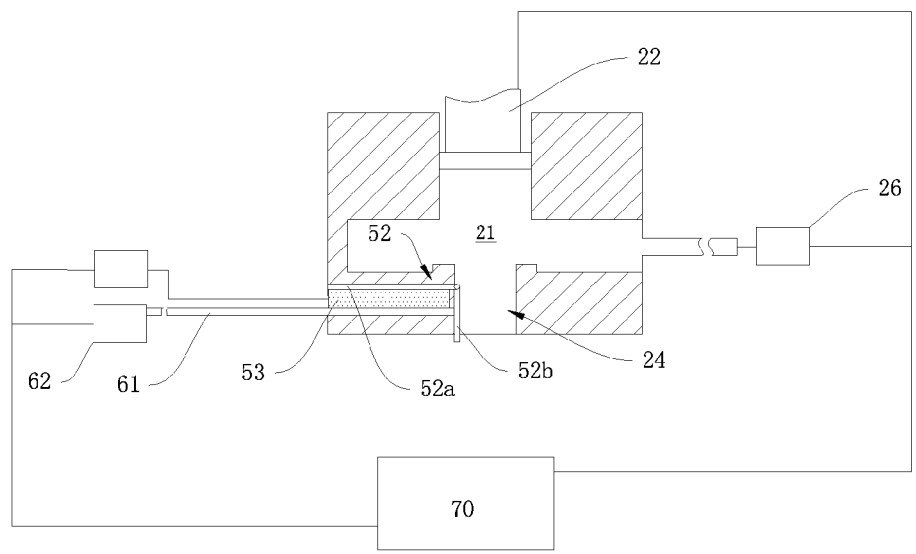
FIG. 4 shows a schematic diagram of a nozzle according to a second embodiment of the present invention.

Referring to FIG. 4, a second angle (about 90 degrees) is defined when the active portion 52b is perpendicular to or near perpendicular to the cross section of the liquid transportation pipe 24. At this time, the active portion 52b is parallel to or near parallel to the flow direction of the alignment film forming composition. The alignment film forming composition can flow out of the liquid transportation pipe 24. The magnetic valve 53 controls magnetic attraction forces of the armature 52 through the driver 51 for controlling mutual variations between the first and second angles.

In another embodiment, only the active portion of the armature 52 is directly hinged to the inside of the liquid transportation pipe 24, which realizes that the armature 52 attaches to the inside of the liquid transportation pipe 24 because of the magnetic forces and rotates in the liquid transportation pipe 24.

To further find ways to solve aggregation and condensation of the alignment film forming composition, blow off additional alignment film forming composition aggregated at the exit of the liquid transportation pipe 24. As shown in FIG. 3, the bottom of the nozzle 20 further comprises a blowing device B corresponding to the exit of the liquid transportation pipe 24. Compared with the control valve A, the blowing device B is disposed closer to the exit (the alignment film forming composition terminal) of the liquid transportation pipe 24. Specifically, the blowing device B comprises an air tube 61 and a blower 62. The air tube 61 is disposed on one side of the liquid transportation pipe 24 and is connected to the liquid transportation pipe 24. The blower 62 is connected to the air tube 61 and supplies flowing air source to the air tube 61. In another embodiment, the air tube 61 can be flexibly disposed on the whole bottom of the nozzle 20 or on the side of the liquid transportation pipe 24 where the exit is disposed. Each of the dispositions can achieve the goal of blowing off the alignment film forming composition.

In addition, to better adjust the operating status of each of the components, a central controller 70 is disposed outside. The central controller 70 is connected to the composition source 26, the pusher 22, the driver 51, and the blower 62, respectively.

Referring to FIG. 3 and FIG. 4, the operating procedures of the ejection head for the alignment film are elaborated.

S1: Assemble the pusher 22, the control valve A, and the blowing device B on the nozzle 20 as shown in FIG. 3. Assemble the plurality of nozzles 20 into an ejection head (not shown). The composition source 26 pours the alignment film forming composition into the chamber 21 of the nozzle 20 through the liquid supply pipe 25. The alignment film forming composition is temporarily preserved in the inner annular groove 23 with the guide of the bulge 27. The alignment film forming composition flows to the liquid transportation pipe 24 when overflowing the inner annular groove 23. Move the ejection head to aim at the print base (not shown) and wait for the glass substrate (not shown) to be put in.

S2: When the ejection head is in an idle state, the nozzle 20 is also in an idle state. The central controller 70 asks the driver 51 to be disconnected from the magnetic valve 53 so that the magnetic valve 53 does not generate magnetism itself. In this way, the armature 52 does not generate the magnetic attraction forces. The first angle is formed by the active portion 52b and the cross section of the liquid transportation pipe 24. Most of the alignment film forming composition or even all of the alignment film forming composition in the liquid transportation pipe 24 is prevented from flowing outside. Meanwhile, the central controller 70 commands the blower 62 to activate, which causes the air tube 61 to blow air to the exit of the liquid transportation pipe 24 constantly. An airflow flows all the time so it is impossible that the alignment film forming composition that remains or oozes out.

S3: When the ejection head turns to an operative status, move the ejection head to aim at the glass substrate on the print base. Meanwhile, the nozzle 20 also enters the operative status. While the central controller 70 keeps the blower 62 in operation, the driver 51 and the magnetic valve 53 are connected. At this time, the magnetic valve 53 is electrified by the driver 51 to generate enough magnetism so that the magnetic valve 53 can be attached to the armature 52, and especially, the active portion 52b is attached to the magnetic valve 53 and rotates. As the active portion 52b rotates, the alignment film forming composition in the chamber 21 flows out of the liquid transportation pipe 24.

The air tube 61 continues supplying air when the active portion 52b rotates. At this time, the active portion 52b is not attached to the liquid transportation pipe 24 completely. The air tube 61 continues blowing air so that the airflow constantly flows past the exit of the liquid transportation pipe 24. After the active portion 52b is opened and the alignment film forming composition is dropped evenly at a predetermined form, the air tube 61 is closed completely.

When the active portion 52b absorbed by the magnetic valve 53 rotates to the inner side of the liquid transportation pipe 24 and attaches to the inner side of the liquid transportation pipe 24, the second angle is formed when the active portion 52b and the cross section of the liquid transportation pipe 24. As shown in FIG. 4, an air gate of the air tube 61 disposed under the magnetic valve 53 is blocked off at this time, which prevents the airflow from being disturbed when the alignment film forming composition is outputted so the alignment film forming composition can be flowed past the liquid transportation pipe 24 smoothly. Meanwhile, the central controller 70 commands the pusher 22 to activate to ensure that the alignment film forming composition is spray-printed on a predetermined position of the glass substrate with an invariable size of droplets and at a constant spraying pace. In the process of spraying, the central controller 70 monitors the quantity of the alignment film forming composition inside the chamber 21 and commands the composition source 26 to supply new alignment film forming composition to the chamber 21 in time.

S4: When one-time spraying is done, the central controller 70 commands the pusher 22 to stop operating. Meanwhile, the central controller 70 commands the driver 51 of the control valve A to be disconnected and commands the magnetic valve 53 to stop supply electricity. Thus, the active portion 52b of the armature 52 returns to the status of the first angle. While the active portion 52b rotates, the air tube 61 is opened gradually. The air tube 61 blows air to the liquid transportation pipe 24 constantly so the alignment film forming composition remaining at the exit of the liquid transportation pipe 24 does not condense or become large droplets. In this way, the nozzle 20 is free from being blocked off. At this time, the ejection head enters the idle state again.

The steps S2, S3, and S4 will be repeated several times until the alignment film is formed.

The control valve A and the blowing device B are newly added in the present invention. The control valve A is used to control switching of the liquid transportation pipe 24, which restricts the output timing of the alignment film forming composition. In addition, the blowing device B is used to keep airflow moving at the exit of the nozzle 20 of the liquid transportation pipe 24 in an idle state, which ensures that the exit of the nozzle 20 is unblocked and that the alignment film forming composition does not aggregate or condense, which prevents the nozzle 20 from being blocked and avoids forming large droplets. In this way, the quality of the alignment film is greatly enhanced owing to uniform spraying and regular output.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ejection head for ejecting alignment film forming composition, comprising a plurality of nozzles disposed on a bottom of the ejection head, each of the plurality of nozzles comprising:
    a chamber, comprising a liquid transportation pipe and a pusher disposed on a bottom and a top of the chamber, respectively, the liquid transportation pipe and the pusher corresponding with each other, and the pusher used for pushing the alignment film forming composition out of the liquid transportation pipe;
    a composition source connected to a liquid supply pipe disposed on the chamber, for transporting the alignment film forming composition to the chamber;
    a control valve disposed on the liquid transportation pipe, for controlling switching of the liquid transportation pipe for restricting output of the alignment film forming composition, the control valve comprising:
        a magnetic valve, including a magnetic armature, operatively disposed in the liquid transportation pipe and comprising an active portion and a fixing portion; and
        a driver for controlling an operating status of the magnetic valve; and
    a blowing device corresponding to an exit of the liquid transportation pipe, for blowing off superfluous alignment film forming composition remaining at the exit of the liquid transportation pipe when the control valve blocks the liquid transportation pipe, the blowing device comprising:
        an air tube, disposed on one side of the liquid transportation pipe and connected to the liquid transportation pipe, for being closed after the active portion is opened; and
        a blower, connected to the air tube, for expelling air to the air tube.

2. The ejection head as claimed in claim 1, wherein
    a first angle is formed between the active portion of the armature and a cross section of the liquid transportation pipe, so that the armature prevents the alignment film forming composition from flowing out of the liquid transportation pipe, and a second angle formed between the active portion of the armature and the cross section of the liquid transportation pipe, so that the armature allows the alignment film forming composition to flow out of the liquid transportation pipe; and
    the magnetic valve, disposed on one side of the liquid transportation pipe and corresponding to the armature, and controlled by the driver to affect magnetic forces that the magnetic valve gives the armature for controlling mutual variations between the first angle and the second angle.

3. The ejection head as claimed in claim 2, wherein the armature forms transition fit with the liquid transportation pipe.

4. The ejection head as claimed in claim 1, wherein the pusher is a ceramic resonator.

5. The ejection head as claimed in claim 1, wherein an inner annular groove is disposed around the liquid transportation pipe in the chamber, the inner annular groove is connected to the liquid supply pipe for temporarily preserving the alignment film forming composition providing by the composition source, a bulge is disposed between the inner annular groove and the liquid transportation pipe for restricting flow direction of the alignment film forming composition flowing from the liquid supply pipe.

6. The ejection head as claimed in claim 1, wherein the nozzle further comprises a central controller connected to the composition source, the pusher, the driver, and the blower, respectively.

* * * * *